United States Patent [19]

Chikamori et al.

[11] Patent Number: 4,918,344
[45] Date of Patent: Apr. 17, 1990

[54] ELECTRIC MOTOR WITH FRICTIONAL PLANETARY SPEED REDUCER

[75] Inventors: Akira Chikamori; Kouichi Ueda, both of Osaka, Japan

[73] Assignee: Koyo Seiko Co., Ltd., Osaka, Japan

[21] Appl. No.: 227,387

[22] Filed: Aug. 2, 1988

[30] Foreign Application Priority Data

Aug. 4, 1987 [JP] Japan .................. 62-195032

[51] Int. Cl.⁴ ...................... H02K 5/167; F16H 13/06
[52] U.S. Cl. ...................................... 310/83; 310/261; 475/149; 475/183
[58] Field of Search ................. 74/798; 310/83, 67 R, 310/80, 261, 265, 266

[56] References Cited

U.S. PATENT DOCUMENTS

| | | | |
|---|---|---|---|
| 2,450,290 | 9/1948 | Maxwell | 310/83 |
| 3,008,061 | 11/1961 | Mims et al. | 310/83 |
| 3,477,315 | 11/1969 | Macks | 74/798 |
| 4,060,010 | 11/1977 | Heden | 74/798 |
| 4,846,008 | 7/1989 | Kraus | 74/798 |
| 4,852,417 | 8/1989 | Tanaka | 310/83 |

Primary Examiner—Patrick R. Salce
Assistant Examiner—D. L. Rebsch
Attorney, Agent, or Firm—Armstrong, Nikaido, Marmelstein, Kubovcik & Murray

[57] ABSTRACT

An electric motor having a frictional planetary speed reducer comprises a hollow cylindrical rotor disposed inside a stator. The speed reducer is at least partly accommodated in the rotor.

6 Claims, 4 Drawing Sheets

ELECTRIC MOTOR WITH FRICTIONAL PLANETARY SPEED REDUCER

BACKGROUND OF THE INVENTION

The present invention relates to electric motors having a frictional planetary speed reducer incorporated therein.

In recent years, servomotors rotatable at a low speed of up to 10 r.p.m. are used as drive means for robots and like automatically controllable machines. Such servomotors include, for example, dc servomotors, ac servomotors, direct drive servomotors and stepping motors. Owing to their construction, however, these servomotors have the problem that the rotation in a low speed range involves marked irregularities or that the motor fails to give high torque.

To compensate for the above drawback of the servomotor in the low speed range, an electric motor has been proposed which has a speed reducer as connected in series with the forward end of its rotor shaft externally thereof (see Unexamined Japanese Patent Publication SHO 58-119746).

The proposed motor nevertheless has the problem that the speed reducer incorporated therein renders the motor corresponding greater in length and weight, consequently imposing limitations on its use.

SUMMARY OF THE INVENTION

An object of the present invention is to provide an electric motor which has a speed reducer incorporated therein and which is rotatable with diminished irregularities at low speeds, affords a great torque output and assures precision control.

Another object of the invention is to provide an electric motor which has a speed reducer incorporated therein and which nevertheless can be made compact and lightweight.

The electric motor having a speed reducer incorporated therein and embodying the present invention is characterized in that the motor comprises a stator, a hollow cylindrical rotor disposed inside the stator, and a frictional planetary speed reducer at least partly accommodated in the rotor.

The rotation of the rotor is subjected to speed reduction by the frictional planetary speed reducer and then transmitted to the output shaft of the motor, so that the motor is rotatable with diminished irregularities and gives a great torque output. Since the speed reducer is at least partly accommodated in the hollow cylindrical rotor, the motor is diminished in the increase in its length due to the presence of the speed reducer. Furthermore, the arrangement wherein the same rotor shaft as conventionally used is serviceable also as the output shaft of the speed reducer results in a corresponding decrease in weight.

The frictional planetary speed reducer is, for example, a planetary roller speed reducer comprising a stationary wheel, a sun roller and planetary rollers. The planetary roller speed reducer may be of two-step construction. The planetary roller to be used is, for example, a hollow cylindrical roller, or a roller having a spherical outer peripheral surface adapted for contact at two points with each of the stationary wheel and the sun roller.

The two-step planetary roller speed reducer comprises, for example, first and second two stationary wheels arranged inside the hollow cylindrical rotor at a predetermined spacing axially thereof, an output shaft provided inside the stationary wheels, a hollow input shaft rotatably provided around the output shaft and having a first sun roller portion, a hollow intermediate shaft rotatably provided around the output shaft and having a second sun roller portion, the input shaft and the intermediate shaft being arranged at a specified spacing axially thereof, the intermediate shaft having a first carrier portion, the output shaft having a second carrier portion, the input shaft being fixedly joined to the rotor, a plurality of planetary rollers mounted on the first carrier portion and rollable between the first sun roller portion and the first stationary wheel in pressing contact therewith, and a plurality of planetary rollers mounted on the second carrier portion and rollable between the second sun roller portion and the second stationary wheel.

DESCRIPTION OF THE PREFERRED EMBODIMENTS

Figure 1:
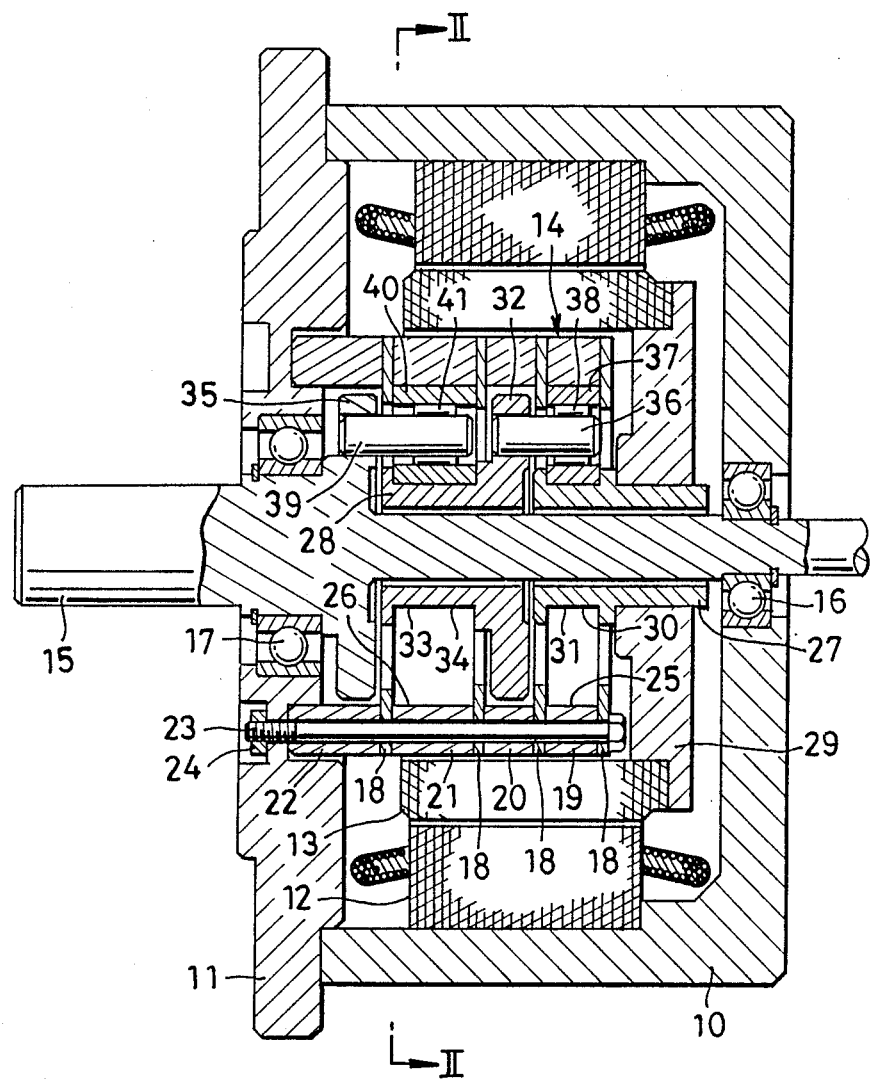
FIG. 1 is a view in vertical section of an electric motor as a first embodiment of the invention.

The invention will be described below in greater detail with reference to the accompanying drawings. In the following description, the terms "left" and "right" are used based on FIGS. 1, 3 and 4,; e.g., "left" refers to the left-hand side of these drawings.

Throughout the drawings, like parts are designated by like reference numerals.

Figure 2:
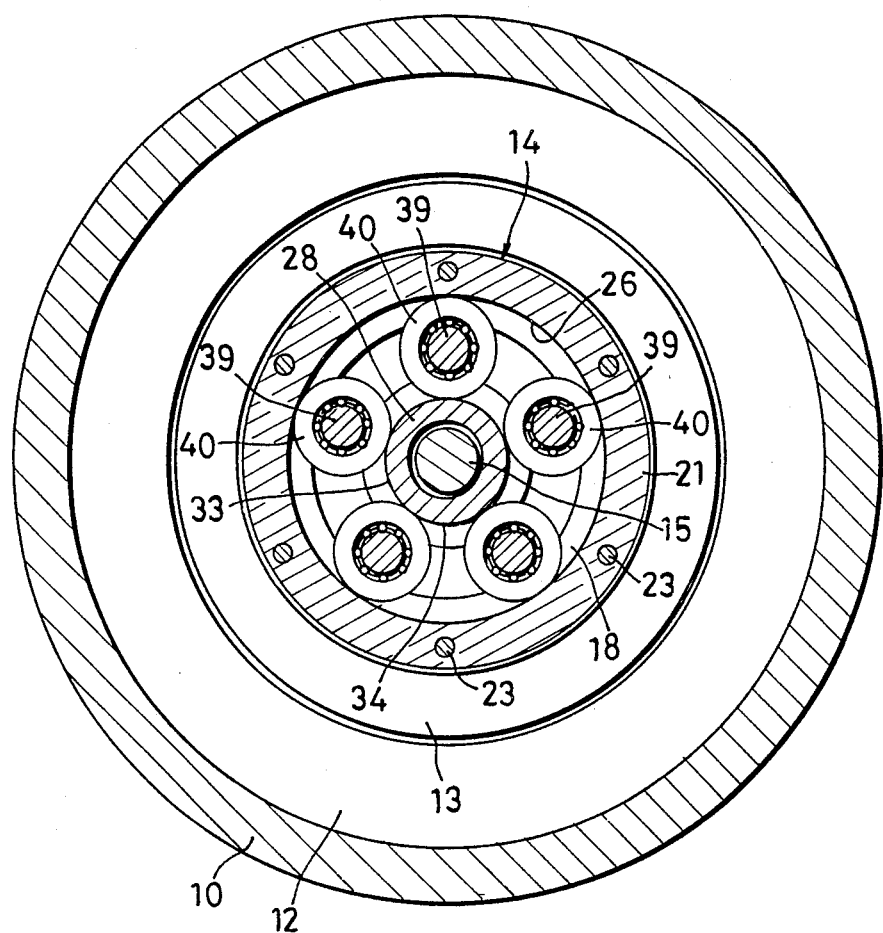
FIG. 2 is a view in section taken along the line II—II in FIG. 1.

FIGS. 1 and 2 show a first embodiment.

The electric motor of the first embodiment is of the flat type having a stator frame 10 in the form of a flat cup with a left open end, and a bracket 11 closing the open end. Provided inside the frame 10 are a stator 12, a rotor 13, a two-step planetary roller speed reducer 14 and an output shaft 15.

The output shaft 15 extends through the frame 10 and the bracket 11 centrally thereof and is rotatably supported by bearings 16, 17 thereon. Although not shown, the output shaft 15 is connected to a rotary encoder or like detector at its right end and to the shaft to be driven at its left end. The stator 12 is secured to the inner periphery of the frame 10 concentrically with the output shaft 15.

The rotor 13 is in the form of a hollow cylinder and is disposed inside the stator 12 concentrically therewith. As will be described below, the speed reducer 14 is provided generally in the space between the rotor 13 and the output shaft 15. A first stationary wheel 19, a spacer 20 and a second stationary wheel 21 are held, as arranged leftward in this order, between four annular partitions 18, and another spacer 22 is fitted to the left side of the partition 18 at the left end to provide a cylindrical assembly. The assembly is disposed inside the rotor 13 immediately adjacent thereto concentrically therewith and fastened to the bracket 11 with bolts 23 extending through the assembly and the bracket 11 and with nuts 24. The partitions 18 are smaller than the stationary wheels 19, 21 in inside diameter, and project inward at opposite sides of the stationary wheels 19, 21 to define annular grooves 25, 26 along the inner peripheries of the wheels 19, 21. A hollow input shaft 27 is rotatably fitted around the right-side portion of the output shaft 15 within the frame 10, and a hollow intermediate shaft 28 around the left-side portion thereof. An end plate 29 in the form of an apertured disk is fixedly fitted around the right end of the input shaft 27. An annular groove 30 is formed in the left-side portion of the input shaft 27 circumferentially thereof, and the outer periphery of this portion defining the groove provides a first sun roller portion 31. The intermediate shaft 28 is formed at its right end with a first carrier portion 32 in the form of an outward flange. An annular groove 33 is formed in the left-side portion of the intermediate shaft 28 circumferentially thereof, and the outer periphery of this portion defining the groove 33 provides a second sun roller portion 34. A second carrier portion 35 in the form of an outward flange is formed at the left end portion of the output shaft 15 within the frame 10. The first carrier portion 32 of the intermediate shaft 28 is fixedly provided with a plurality of (e.g. five) pins 36 extending therefrom in parallel to the output shaft 15 around the input shaft 27 at the right side and equidistantly spaced apart on a circumference centered about the output shaft 15. A first planetary roller 37 is rotatably mounted on each pin 36 with a needle roller bearing 38 provided therebetween. The planetary rollers 37 are fitted in the groove 30 of the input shaft 27 and in the groove 25 along the inner periphery of the first stationary wheel 19 and are rollable between the first sun roller portion 31 and the first stationary wheel 19 in pressing contact therewith. The second carrier portion 35 of the output shaft 15 is fixedly provided with a plurality of (e.g. five) pins 39 extending therefrom in parallel to the output shaft 15 around the intermediate shaft 28 at the right side and equidistantly spaced apart on a circumference centered about the output shaft 15. A second planetary roller 40 is rotatably mounted on each of the pins 39 with a needle roller bearing 41 provided therebetween. The planetary rollers 40 are fitted in the groove 33 of the intermediate shaft 28 and in the groove 26 along the inner periphery of the second stationary wheel 21 and are rollable between the second sun roller portion 34 and the second stationary wheel 21 in pressing contact therewith.

With the above motor, the rotation of the rotor 13 is transmitted directly to the input shaft 27 through the end plate 29. The rotation of the input shaft 27 is subjected to speed reduction by the first sun roller portion 31, the first stationary wheel 19 and the first planetary rollers 37 and then delivered to the intermediate shaft 28. The rotation of the intermediate shaft 28 is subjected to speed reduction at the same ratio as above by the second sun roller portion 34, the second stationary wheel 21 and the second planetary rollers 40 and transmitted to the output shaft 15.

In the case of the first embodiment, the rotation of the rotor 13 is transmitted to the output shaft 15 upon speed reduction by the two-step planetary roller speed reducer 14, which therefore achieves a great reduction ratio in its entirety. The motor is accordingly rotatable with diminished irregularities to give a great torque output. The planetary roller speed reducer 14 can be compact in itself, and a major portion of the reducer is disposed inside the cylindrical rotor 13, whereby the motor can be compacted in its entirety, while the provision of the speed reducer entails only a very small increase in the length of the motor. Further the output shaft 15 also serves the same function as the rotor shaft of the conventional motor with a speed reducer. This results in a corresponding decrease in weight.

Figure 3:
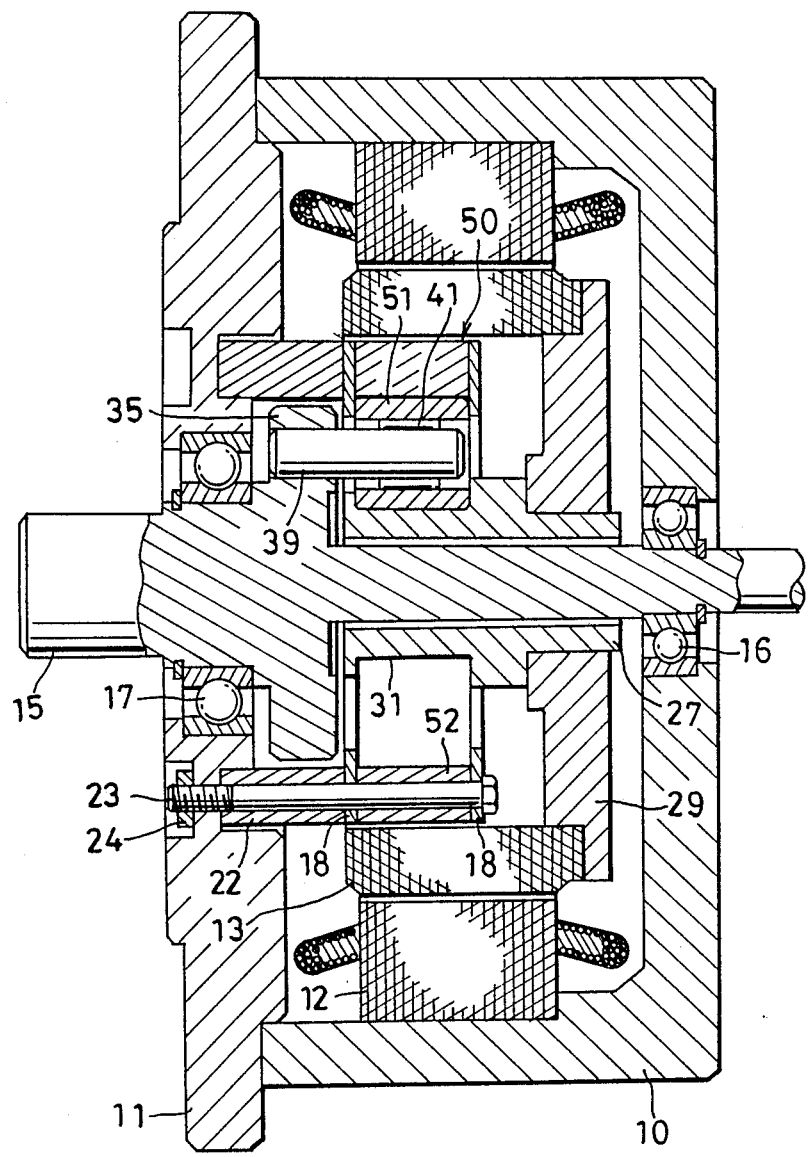
FIG. 3 is a view in vertical section of another electric motor as a second embodiment of the invention.

FIG. 3 shows a second embodiment.

The electric motor of this embodiment has a single-step planetary roller speed reducer 50. In this case, a plurality of planetary rollers 51 mounted on a carrier portion 35 of an output shaft 15 are in pressing contact with, and rollable between, a stationary wheel 52 fastened to a bracket 11 and a sun roller portion 31 formed on an input shaft 27. The rotation of a rotor 13 and input shaft 27 is transmitted to the output shaft 15 upon speed reduction by the sun roller portion 31, stationary wheel 52 and planetary rollers 51.

With the exception of the above feature, the second embodiment has the same construction as the first.

With the first and second embodiments, the planetary rollers 37, 40 and 51 are each in the form of a hollow cylinder, are in linear contact with the stationary wheel 19, 21 or 52 and are therefore great in the length of contact, hence the advantage of transmitting a great torque.

Figure 4:
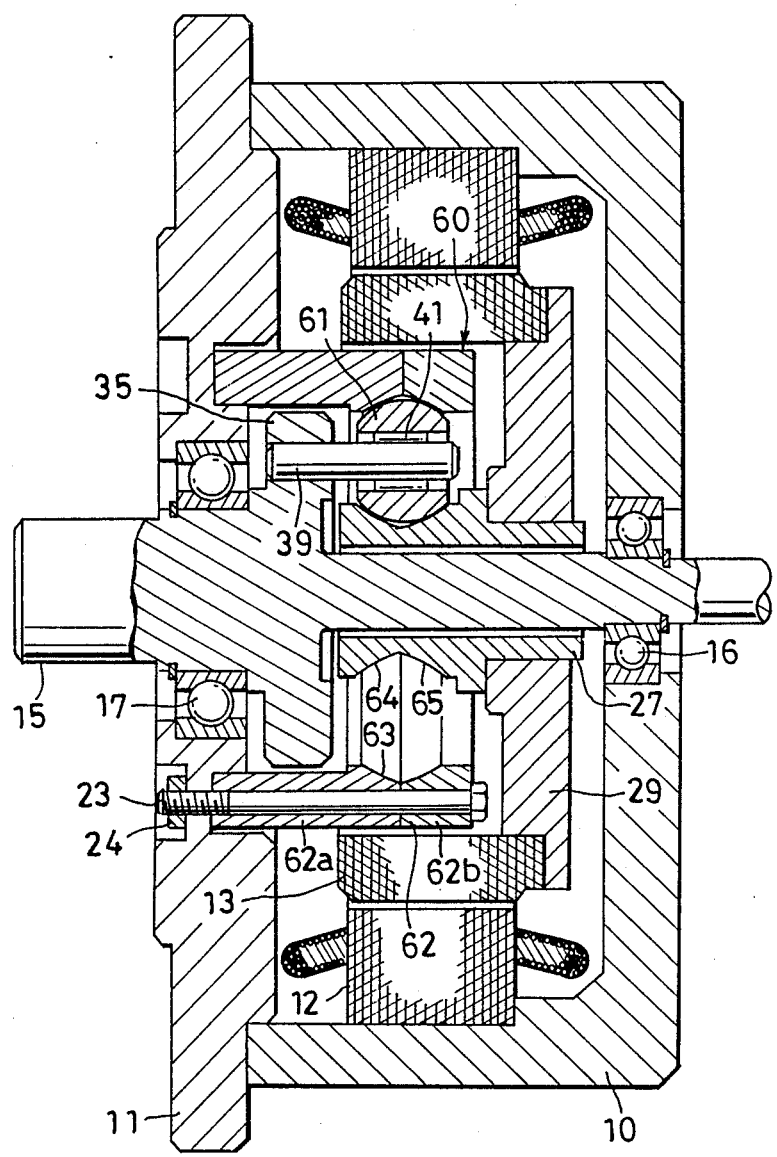
FIG. 4 is a view in vertical section of another electric motor as a third embodiment of the invention.

FIG. 4 shows a third embodiment.

The electric motor of this embodiment also has a single-step planetary roller speed reducer 60. With the third embodiment, each of planetary rollers 61 is generally in the form of a single ball, and the spherical outer peripheral surface of the roller is fitted in a groove 63 of a stationary wheel 62 secured to a bracket and in a groove 65 defined by a sun roller portion 64 of an input shaft 27, in pressing contact with the wheel 62 and the sun roller portion 64. The grooved portion 63 of the stationary wheel 62 and the sun roller portion 64 defining the groove 65 each comprise two parts having a radius of curvature greater than the radius of the planetary roller 61. The outer peripheral portion of the planetary roller is in contact at two points with each of the grooved portion 63 and the sun roller portion 64. To permit assembly, the stationary wheel 62 is composed of two divided segments 62a, 62b, which are fastened together with bolts 23.

With the exception of the feature described, the third embodiment has the same construction as the second.

In the case of the third embodiment, the planetary rollers 61 are in point-to-point contact with the stationary wheel 62 and with the sun roller portion 64 only in the grooves 63, 65, so that the contact involves some differential slippage but diminished sliding friction, hence the advantage of a high transmission efficiency.

What is claimed is:

1. An electric motor with a frictional planetary speed reducer having a stator portion provided with a stator, an output shaft supported by said stator portion with a bearing therebetween, a rotor opposed to the stator and located between said output shaft and the stator, and the frictional planetary speed reducer located between said rotor and said output shaft, said frictional planetary speed reducer comprising:

a hollow cylindrical stationary wheel, one end of which is fixed to said stator portion and a free end of which is arranged in the vicinity of an inner periphery of said rotor;
  a hollow cylindrical input shaft directly connected with an endplate extending radially inward from the end portion of said rotor at the free end side of the stationary wheel, said input shaft being arranged so as to form a determined space interposed between an inner periphery of said stationary wheel and an outer periphery of said input shaft as opposed to each other;

a plurality of planetary rollers being arranged circumferentially at regular intervals so as to be fitted in pressing contact into said space interposed between said stationary wheel and said input shaft;

a plurality of carrier pins each of which is arranged inside a planetary roller with a needle roller therebetween; and a carrier portion fixed to said output shaft and mounting each of said plurality of carrier pins.

2. An electric motor as defined in claim 1, wherein said planetary rollers are hollow cylindrical rollers and the raceway surfaces of said input shaft and said stationary wheel which interpose said planetary rollers in pressing contact therebetween are cylindrical surfaces so that the axial sectional shapes of the raceway surfaces are parallel to an axial line.

3. An electric motor as defined by claim 1, wherein said planetary rollers are hollow spherical rollers and the raceway surfaces of said input shaft and said stationary wheel which interpose said planetary rollers in pressing contact therebetween are spherical surfaces so that the axial sectional shapes of the raceway surfaces are arc shaped.

4. An electric motor with a frictional planetary speed reducer having a stator portion provided with a stator, an output shaft supported by said stator portion with a bearing therebetween, a rotor opposed to the stator and located between said output shaft and the stator, and the frictional planetary speed reducer located between said rotor and said output shaft, said frictional planetary speed reducer comprising:

a hollow cylindrical stationary wheel, one end of which is fixed to said stator portion and a free end of which is arranged in the vicinity of an inner periphery of said rotor;

a hollow cylindrical input shaft directly connected with an endplate extending radially inward from the end portion of said rotor at the free end side of the stationary wheel, said input shaft being arranged so as to form a determined first space interposed between an inner periphery of said stationary wheel and an outer periphery of said input shaft as opposed to each other;

a plurality of first planetary rollers being arranged circumferentially at regular intervals so as to be fitted in pressing contact into said first space interposed between said stationary wheel and said input shaft;

a plurality of first carrier pins each of which is arranged inside each first planetary roller with a needle roller therebetween;

a hollow intermediate shaft having a carrier portion wherein each first carrier pin is mounted, said intermediate shaft extending axially from an inner periphery portion of said carrier portion so as to form a determined second space between said stationary wheel and said intermediate shaft;

a plurality of second planetary rollers being arranged circumferentially at regular intervals so as to be fitted in pressing contact into said second space interposed between said stationary wheel and said intermediate shaft;

a plurality of second carrier pins each of which is arranged inside a second planetary roller with a needle roller therebetween; and a carrier portion fixed to said output shaft and mounting each of said plurality of second carrier pins.

5. An electric motor as defined by claim 4, wherein said planetary rollers are hollow cylindrical rollers and the raceway surfaces of said input shaft and said stationary wheel which interpose said planetary rollers in pressing contact therebetween are cylindrical surfaces so that the axial sectional shapes of the raceway surfaces are parallel to an axial line.

6. An electric motor as defined by claim 4, wherein said planetary rollers are hollow spherical rollers and the raceway surfaces of said input shaft and said stationary wheel which interpose said planetary rollers in pressing contact therebetween are spherical surfaces so that the axial sectional shapes of the raceway surfaces are arc shaped.

* * * * *